E. C. MORINE.
PROCESS OF MAKING BIFOCAL LENSES.
APPLICATION FILED OCT. 20, 1911.
1,157,410. Patented Oct. 19, 1915.
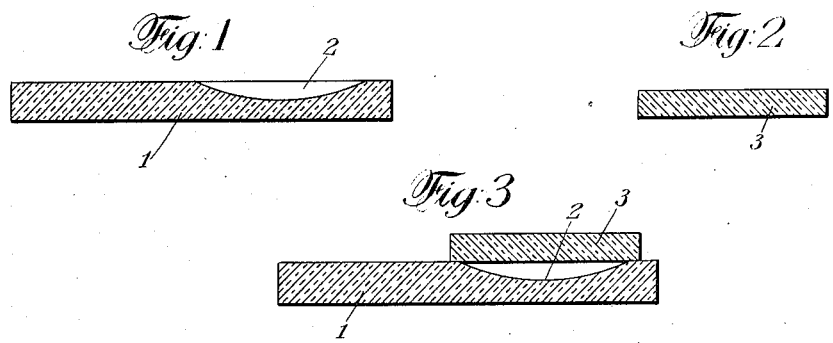
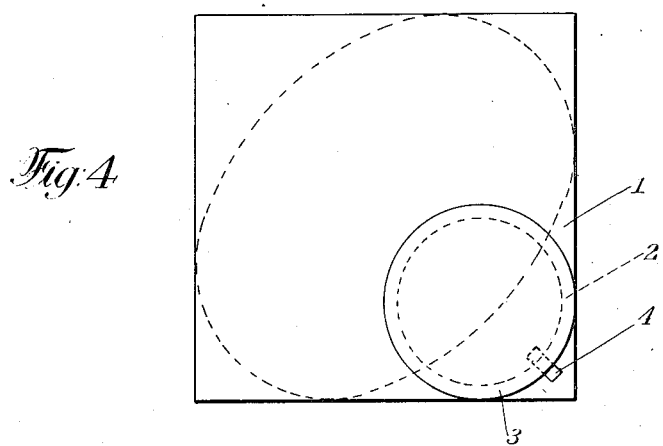
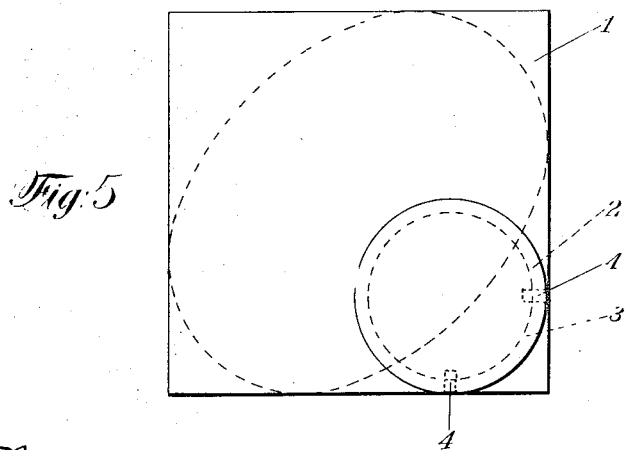

UNITED STATES PATENT OFFICE.

EDWIN C. MORINE, OF NEW YORK, N. Y., ASSIGNOR, BY MESNE ASSIGNMENTS, TO KRYPTOK COMPANY, OF NEW YORK, N. Y., A CORPORATION OF NEW YORK.

PROCESS OF MAKING BIFOCAL LENSES.

1,157,410.     Specification of Letters Patent.     Patented Oct. 19, 1915.

Application filed October 20, 1911. Serial No. 655,797.

*To all whom it may concern:*

Be it known that I, EDWIN C. MORINE, of New York, in the county of New York, and in the State of New York, have invented a certain new and useful Improvement in Processes of Making Bifocal Lenses, and do hereby declare that the following is a full, clear, and exact description thereof.

My invention relates particularly to manufacturing bifocal lenses of a type where the lens for near vision is welded into a recess or cavity in the lens used for far vision.

In the methods now used for manufacturing bifocal lenses of this type, great difficulty has arisen in preventing the formation of air-bubbles in the body of the united bifocal lenses between the major and minor lenses, owing to the fact that the blank used for near vision which is to be welded into a corresponding cavity in the blank used for far vision is thinner at the edge than it is at the center, and that therefore, the edges of the small blank become plastic first, thereby trapping a quantity of air between the two blanks.

In accordance with my invention, I provide a blank designed to be used to produce the major lens element with a groove or canal, leading from one edge of the blank to a point near the lower part of the cavity provided in the main blank. The presence of this groove permits the continual escape of air while the welding operation is going on and in the subsequent finishing of the bifocal lenses, the portion of the blank carrying the groove is ground away.

In the accompanying drawings, I have shown blanks in various stages of development in accordance with my process, in which—

Figure 1 represents a blank designed to be used to produce the major lens; Fig. 2 represents a blank to be used to produce the minor lens; Fig. 3 shows the manner of applying the minor lens element to the major lens element at the beginning of the welding operation; Fig. 4 is a plan view of the fused bifocal blank showing the groove in one position, and Fig. 5 is a similar view of a blank showing the use of a plurality of such grooves.

In the drawings, 1 indicates a blank designed to be used to produce the major lens element, said blank having a cavity or depression 2.

3 represents a blank designed to be used for producing the minor lens element. It will be noted that the blank 1 is provided with a groove or canal 4 which extends to the edge of the blank 1 from a point near the bottom of the depression 2. As shown in Fig. 4, I may make use of only one such groove or canal, or as shown in Fig. 5, I may make use of a plurality of such grooves 4.

In the process of welding the two blanks together, the small blank 3 is superimposed upon the blank 1 at a point above the cavity or depression 2 and the parts are subjected to sufficient heat to cause the blank 3 to fill the cavity or depression 2. During the welding operation, the air contained in the cavity or depression 2 is forced outwardly through the canal or canals 4 until the depression or cavity is entirely filled. In the subsequent finishing of the fused bifocal blank, the portion carrying the groove or grooves 4 is entirely cut away, as shown in dotted lines in Figs. 4 and 5.

While I have described my process above in detail, I wish it to be understood that many changes may be made therein without departing from the spirit of my invention.

What is claimed and it is desired to secure by Letters Patent is:

The process of making bifocal lens blanks which consists in forming a concave lenticular surface in one blank element and providing a canal leading from said surface to the exterior surface of said element, then placing a second blank element over said concave surface and applying heat to the assembled elements until they are welded together, whereby air between the elements will be permitted to escape through the canal during the welding operation.

In testimony that I claim the foregoing I have hereunto set my hand.

EDWIN C. MORINE.

Witnesses:
MOSES H. HARRIS,
MINERVA LOBEL.